(12) United States Patent
Zhang et al.

(10) Patent No.: US 12,469,249 B2
(45) Date of Patent: Nov. 11, 2025

(54) METHOD AND APPARATUS FOR OBSTACLE DETECTION UNDER COMPLEX WEATHER

(71) Applicant: NANJING UNIVERSITY OF POSTS AND TELECOMMUNICATIONS, Nanjing (CN)

(72) Inventors: Dengyin Zhang, Nanjing (CN); Wenhong Xin, Nanjing (CN); Xiaofei Jin, Nanjing (CN)

(*) Notice: Subject to any disclaimer, the term of this patent is extended or adjusted under 35 U.S.C. 154(b) by 280 days.

(21) Appl. No.: 18/469,593

(22) Filed: Sep. 19, 2023

(65) Prior Publication Data

US 2024/0005626 A1 Jan. 4, 2024

Related U.S. Application Data

(63) Continuation of application No. PCT/CN2023/103129, filed on Jun. 28, 2023.

(30) Foreign Application Priority Data

Sep. 7, 2022 (CN) .......................... 202211098795.5

(51) Int. Cl.
*G06V 10/36* (2022.01)
*G06V 10/764* (2022.01)
(Continued)

(52) U.S. Cl.
CPC ............ *G06V 10/36* (2022.01); *G06V 10/764* (2022.01); *G06V 10/774* (2022.01);
(Continued)

(58) Field of Classification Search
CPC .... G06V 10/36; G06V 10/806; G06V 10/764; G06V 10/82; G06V 10/774;
(Continued)

(56) References Cited

U.S. PATENT DOCUMENTS

| 2012/0002052 A1 | 1/2012 | Muramatsu et al. |
| 2013/0088598 A1 | 4/2013 | Muramatsu et al. |
| 2017/0028986 A1 | 2/2017 | Kuroda |

FOREIGN PATENT DOCUMENTS

| CN | 111709381 A | * | 9/2020 | ............ G06F 18/241 |
| CN | 112906485 A | * | 6/2021 | .............. G06N 3/045 |

OTHER PUBLICATIONS

Shi et al. "Fast classification and detection of marine targets in complex scenes with YOLOv3." Oceans 2019—Marseille. IEEE (Year: 2019).*

(Continued)

*Primary Examiner* — Sumati Lefkowitz
*Assistant Examiner* — Michael Adam Shariff

(57) ABSTRACT

The present invention discloses a method and an apparatus for obstacle detection under complex weather. The method includes: obtaining an image under a complex weather condition; performing enhanced preprocessing on the image by using a multi-scale retinex with color restoration MSRCR algorithm; inputting the preprocessed image into a trained obstacle detection model based on an improved YOLOv3 network; and according to output of the obstacle detection model based on the improved YOLOv3 network, determining an obstacle detection result under the complex weather; replacing a Leaky-ReLU activation function in convolutional layers in the original YOLOv3 network with an ELU activation function; and training the obstacle detection model with the processed data set to obtain a trained obstacle detection model based on the improved YOLOv3 network.

9 Claims, 5 Drawing Sheets

(51) Int. Cl.
| | |
|---|---|
| *G06V 10/774* | (2022.01) |
| *G06V 10/776* | (2022.01) |
| *G06V 10/80* | (2022.01) |
| *G06V 10/82* | (2022.01) |
| *G06V 20/50* | (2022.01) |
| *G06V 40/10* | (2022.01) |

(52) U.S. Cl.
CPC .......... *G06V 10/776* (2022.01); *G06V 10/806* (2022.01); *G06V 10/82* (2022.01); *G06V 20/50* (2022.01); *G06V 40/10* (2022.01); *G06V 2201/08* (2022.01)

(58) Field of Classification Search
CPC ...... G06V 10/776; G06V 20/50; G06V 40/10; G06V 2201/08
See application file for complete search history.

(56) References Cited

OTHER PUBLICATIONS

Hassaballah et al. "Vehicle detection and tracking in adverse weather using a deep learning framework"; IEEE transactions on intelligent transportation systems 22.7 (2020): 4230-4242 (Year: 2020).*

Guo et al. "Research on underwater target detection method based on improved MSRCP and YOLOv3"; 2021 IEEE international conference on mechatronics and automation (ICMA); IEEE, (Year: 2021).*

Francies et al. "A robust multiclass 3D object recognition based on modern YOLO deep learning algorithms"; Concurrency and Computation: Practice and Experience 34.1 (2022): e6517 (Year: 2022).*

* cited by examiner

METHOD AND APPARATUS FOR OBSTACLE DETECTION UNDER COMPLEX WEATHER

TECHNICAL FIELD

The present invention relates to the technical field of image processing, and specifically, to a method and an apparatus for obstacle detection under complex weather.

BACKGROUND

In recent years, with rapid development of society and economy, the number of automobiles owned in China has increased rapidly. While vehicles bring great convenience to daily life, problems such as frequent traffic accidents have also brought challenges to public transportation safety. Therefore, there is an increasingly urgent need for vehicles to accurately detect obstacles. Currently available autonomous driving systems and most automated driver assistance systems can sense the environment around the vehicle and make corresponding judgment and actions based on the environment. Vehicles mainly rely on sensor devices (for example, depth cameras, lidars, and ultrasound) to acquire environmental information. Compared with other sensor devices in the acquisition of environmental information, cameras can not only obtain richer scene information, but also have advantages such as low cost and easy integration.

With the development of deep learning technology, target detection algorithms based on deep learning are widely used in target detection. Among then, the two-stage target detection algorithm represented by Faster-RCNN greatly improves the accuracy of target detection, but its detection speed is slow and cannot meet real-time requirements. Although the single-stage target detection algorithm represented by the YOLO algorithm has a faster detection speed, its detection accuracy for small targets is relatively low. In 2018, Redmon J's team proposed the YOLOv3 algorithm, which uses a deep residual network to extract image features and achieves multi-scale prediction.

Due to possible interference from weather and environmental factors such as rain, snow, dust, smog, strong light, and night, road images may have problems such as distortion, blur, and low contrast, which affects obstacle detection for images. In addition, the YOLOv3 network itself has some defects in detection of obstacles on roads under complex weather. If the YOLOv3 algorithm is used directly, the detection and classification accuracy of obstacles will be significantly reduced.

SUMMARY

To overcome disadvantages in the prior art, the present invention provides a method for obstacle detection under complex weather, proposing an obstacle detection method which fuses a multi-scale retinex with color restoration (MSRCR) algorithm and an improved YOLOv3 target detection algorithm. First, a raw image is subjected to image enhancement preprocessing via the MSRCR algorithm to improve contrast and detail quality of the image. Then, a YOLOv3 network is optimized with an SPP module introduced and an ELU activation function used to increase robustness to noise, and a suitable data set is selected with anchor boxes in the original YOLOv3 network re-clustered by applying a K-Means++ algorithm on the data set, and the training data set is used to train an improved YOLOv3 network. Finally, the image having been subjected to enhanced preprocessing is input into the trained detection network for detection and classification. In the present invention, the improved YOLOv3 network is employed for detection of obstacles in an image having been subjected to image enhancement, thereby improving the accuracy of detection.

Technical solution: To resolve the foregoing technical problem, a technical solution used in the present invention is as follows:

According to a first aspect, a method for obstacle detection under complex weather is provided, including:
  obtaining an image under a complex weather condition;
  performing enhanced preprocessing on the image by using a multi-scale retinex with color restoration MSRCR algorithm to obtain a preprocessed image;
  inputting the preprocessed image into a trained obstacle detection model based on an improved YOLOv3 network; and
  according to output of the obstacle detection model based on the improved YOLOv3 network, determining an obstacle detection result under the complex weather;
  where a method for establishing the obstacle detection model based on the improved YOLOv3 network includes:
  inserting an SPP module into a convolutional set of YOLOv3 to fuse different scale characteristics for extraction of more detailed information to further improve detection accuracy, and replacing a Leaky-ReLU activation function in convolutional layers in the original YOLOv3 network with an ELU activation function to increase robustness to noise;
  obtaining a data set for obstacle detection under different weather conditions to improve robustness of the training model;
  re-clustering ground truth boxes in the data set by using a K-Means++ algorithm to obtain suitable anchor boxes, increasing a convergence speed of sample training and improving positioning accuracy; and
  training the obstacle detection model with the processed data set to obtain the trained obstacle detection model based on the improved YOLOv3 network.

In some embodiments, the performing enhanced preprocessing on the image by using a multi-scale retinex with color restoration MSRCR algorithm includes:
  employing a weighted sum of several different Gaussian scale parameters, using a Gaussian filtering result as an estimated illumination image, and adding a color restoration factor to restore color of a reflection image to avoid color degradation, with a calculation formula as follows:

$$F_{MSRCR}(x, y) = C_i \sum_{j=1}^{N} \omega_j [lgI_i(x, y) - lg(I_i(x, y) \otimes G_j(x, y))]$$

$$G_j(x, y) = \frac{1}{2\pi\sigma_j^2} \exp\left(-\frac{x^2+y^2}{2\sigma_j^2}\right)$$

$$C_i = \beta lg\left[\frac{\alpha I_i(x, y)}{\sum_{i=1}^{3} I_i(x, y)}\right]$$

where $F_{MSRCR}(x, y)$ is an enhanced result of processing by the MSRCR algorithm, x and y represent abscissa and ordinate of image pixels respectively, i represents an ordinal position number of a color component, j represents an ordinal position number of a scale parameter, $C_i$ is a color restoration factor of an $i^{th}$ color component, N is the number of scale parameters, $\omega_j$ is weight corresponding to different scales, $I_i(x, y)$ represents an $i^{th}$ color component of the input image, $G_j(x, y)$ represents a Gaussian filter with a scale of a $\sigma_j$, $\sigma_j$ represents a scale parameter of a $j^{th}$ Gaussian surround, $\otimes$ is a convolution symbol, $\alpha$ is a nonlinear strength adjustment parameter, and $\beta$ is a gain factor.

Further, N=3, representing three scales: small, medium and large.

In some embodiments, the SPP module includes a total of four branches: a first branch is a branch with direct connection between input and output, a second branch is the maximum pooling with a 5×5 pooling core, a third branch is the maximum pooling with a 9×9 pooling core, and a fourth branch is the maximum pooling with a 13×13 pooling core, where a step size of each pooling is 1, and padding is performed before pooling to keep size and depth of a final characteristic map unchanged, so that the SPP module finally fuses different scale characteristics.

In some embodiments, the replacing a Leaky-ReLU activation function for convolutional layers in the original YOLOv3 network with an ELU activation function includes:
the ELU activation function, having a calculation formula:

$$u = \begin{cases} e^m - 1, & m \le 0 \\ m, & m > 0 \end{cases}$$

where u and m represent abscissa and ordinate of the function respectively, the ELU activation function has a non-zero gradient for all negative values, eliminating the problem of neuron death, where, when abnormal input occurs in use of the ELU activation function, no large gradient is produced during backward propagation, preventing neuron death or vanishing gradient, which can shorten training time and improve accuracy in network training; when m in ELU is 0 or negative, an exponential function is used, and as the parameter decreases, the function gradually converges to a negative value; convergence means that there is a small derivative value, which reduces variation and information propagated to a next layer; and therefore, the ELU activation function is more robust to noise, able to reduce impact of image noise on the detection result.

In some embodiments, the obtaining a data set for obstacle detection under different weather conditions to improve robustness of the training model includes: selecting a representative KITTI data set and CODA data set, and supplementing the KITTI data set using the CODA data set with corresponding tags modified, to obtain the data set for obstacle detection under different weather conditions; and reserving a test set from the obtained data set, and using the rest of the data set as a training set to increase the robustness of the training model.

In some embodiments, the supplementing the KITTI data set using the CODA data set with corresponding tags modified includes:
categorizing obstacle tags into car, van, truck, pedestrian, pedestrian (sitting), cyclist, tram, and misc for detection and classification;
expanding a complex weather data set part of the CODA data set through Mixup, Cutmix, and Cutout data enhancement methods, and modifying corresponding tags to allow for conformance to the classification of obstacle tags; and adjusting images in the data set to a uniform size of 416×416 pixels for ease of training of the obstacle detection model based on the improved YOLOv3 network.

In some embodiments, the training the obstacle detection model with the processed data set includes:
training the improved YOLOv3 network under the training set part of the data set, adjusting parameters accordingly according to an actual situation, and evaluating performance of the model by using mAP, a mean of various categories of AP, where a calculation formula is as follows:

$$mAP = \frac{\sum_{a=1}^{k} AP_a}{k}$$

where mAP refers to a mean of various categories of AP, $AP_a$ is an area under a precision-recall curve of the $a^{th}$ category, k represents the total number of categories, and a represents an ordinal position number of the category; and a larger value of the mean average precision mAP indicates a higher overall recognition accuracy of the model, with the reserved test set used to verify the effect, and the trained obstacle detection model based on the improved YOLOv3 network is thus obtained.

According to a second aspect, the present invention provides an apparatus for obstacle detection under complex weather, including a processor and a storage medium, where
the storage medium is configured to store an instruction; and
the processor is configured to operate based on the instruction to perform steps of the method in the first aspect.

According to a third aspect, the present invention provides a storage medium, storing a computer program, where when the computer program is executed by a processor, steps of method in the first aspect are implemented.

The present invention has the following advantages: In the method provided in the present invention, the method for obstacle detection that fuses the multi-scale retinex with color restoration (MSRCR) algorithm and the improved YOLOv3 target detection algorithm is proposed, to resolve a problem that an obstacle in a road image cannot be precisely detected under complex environments such as rain, snow, dust, smog, strong light, and night. An image under detection is subjected to image enhancement preprocessing via the MSRCR algorithm to improve contrast and detail quality of the image. Then a YOLOv3 network is optimized with the SPP module introduced to fuse different scale characteristics to improve detection accuracy, and the ELU activation function used to increase robustness to noise, and a data set suitable for the scene is obtained with ground truth boxes in the data set re-clustered by using a K-Means++ clustering algorithm to obtain anchor boxes with a more suitable size to allow for more accurate positioning of targets, followed by network training. Finally, the enhanced image is input into the trained improved YOLOv3 network to obtain the detection result. The present invention improves the accuracy and robustness of obstacle detection under complex weather using the foregoing method.

DESCRIPTION OF EMBODIMENTS

Figure 1:
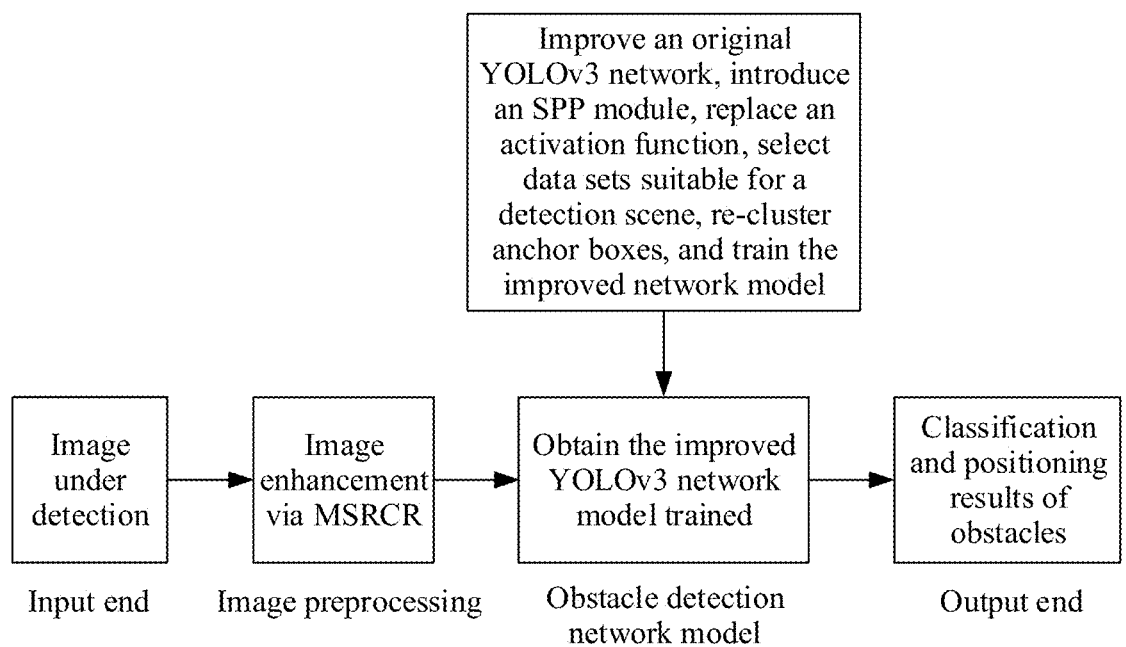
FIG. 1 is a flowchart of a method according to an embodiment of the present invention.

To facilitate understanding of the technical means, creative characteristics, goals, and effects achieved via the present invention, the present invention is further described below with reference to specific embodiments.

In the description of the present invention, "several" means more than one, and "multiple" means more than two. "Greater than", "less than", "exceed", and the like are understood as exclusion of the number itself, and "above", "below", "within", and the like are understood as inclusion of the number itself "First" and "second" if mentioned are merely intended for differentiation between technical features, and shall not be understood as any indication or implication of relative importance, or any implicit indication of the number or the sequence of technical features indicated.

In the description of the present invention, the description referring to the terms "an embodiment", "some embodiments", "exemplary embodiments", "an example", "a specific example", or "some examples" means a specific feature, structure, material or characteristic described with reference to the embodiment or example is included in at least one embodiment or example of the present invention. In this specification, illustrative expressions of these terms do not necessarily refer to the same embodiment or example. Moreover, the specific feature, structure, material, or characteristic described may be combined in any suitable manner in any one or more embodiments or examples.

The YOLOv3 algorithm is an improvement on YOLOv1 and YOLOv2, having advantages of high detection precision, accurate positioning, and a high speed. Especially when a multi-scale prediction method is introduced, the YOLOv3 algorithm can be used to detect a small target and has good robustness to an environmental scene, and therefore, currently, the YOLOv3 algorithm is still a research hotspot. To extract deeper feature information, in YOLOv3, a Darknet-53 network is used as a backbone network. In the Darknet-53 network, a large number of 1×1 and 3×3 convolutional layers and residual units are used to obtain more meaningful semantic information from the foregoing sampled characteristics and obtain information with finer granularity from the foregoing characteristic map.

A purpose of an image enhancement technology is to improve the image quality, show useful information in the image, and make the image more suitable for human visual perception to obtain an effect of machine recognition more easily. The multi-scale retinex with color restoration (MSRCR) algorithm is an improvement and enhancement based on the single-scale retinex (SSR) algorithm and multi-scale retinex (MSR) algorithm, and can significantly improve an image color cast effect of the two existing algorithms and expand a dynamic range of the image, so that details of bright and dark regions of the image can be well reflected. Preprocessing the image by using the image enhancement technology can more accurately detect the obstacle in the image.

Embodiment 1

A method for obstacle detection under complex weather includes:

obtaining an image under a complex weather condition;

performing enhanced preprocessing on the image by using a multi-scale retinex with color restoration MSRCR algorithm to obtain a preprocessed image;

inputting the preprocessed image into a trained obstacle detection model based on an improved YOLOv3 network; and according to output of the obstacle detection model based on the improved YOLOv3 network, determining an obstacle detection result under the complex weather;

where a method for establishing the obstacle detection model based on the improved YOLOv3 network includes:

inserting an SPP module into a convolutional set of YOLOv3 to fuse different scale characteristics for extraction of more detailed information to further improve detection accuracy, and replacing a Leaky-ReLU activation function in a convolutional layer in the original YOLOv3 network with an ELU activation function to increase robustness to noise;

obtaining a data set for obstacle detection under different weather conditions to improve robustness of the training model;

re-clustering ground truth boxes in the data set by using a K-Means++ algorithm to obtain suitable anchor boxes, increasing a convergence speed of sample training and improving positioning accuracy; and training the obstacle detection model with the processed data set, to obtain the trained obstacle detection model based on the improved YOLOv3 network.

In some embodiments, as shown in FIG. 1, the method for obstacle detection under complex weather includes the following detailed steps:

S1. Preprocess an image by using an image enhancement MSRCR algorithm, to reduce problems of low contrast and blurred details in the image under a complex weather condition, thereby facilitating characteristic extraction from the image.

The step specifically includes:

S11. Perform image feature enhancement by using the MSRCR algorithm. The MSRCR algorithm employs a weighted sum of several different Gaussian scale parameters, uses a Gaussian filtering result as an estimated illumination image, and adds a color restoration factor to restore color of a reflection image. This avoids the problem of color degradation, and ensures that the enhanced image has better color. A calculation formula is as follows:

$$F_{MSRCR}(x, y) = C_i \sum_{j=1}^{N} \omega_j [lgI_i(x, y) - lg(I_i(x, y) \otimes G_j(x, y))]$$

$$G_j(x, y) = \frac{1}{2\pi\sigma_j^2} \exp\left(-\frac{x^2+y^2}{2\sigma_j^2}\right)$$

$$C_i = \beta lg\left[\frac{\alpha I_i(x, y)}{\sum_{i=1}^{3} I_i(x, y)}\right]$$

where x and y represent abscissa and ordinate of image pixels respectively, i represents an ordinal position number of a color component, j represents an ordinal position number of a scale parameter, $I_i(x, y)$ represents an $i^{th}$ color component of the input image, $\omega_j$ is weight corresponding to different scales, and N is the number of scale parameters, where N=3 usually, representing small, medium and large; and $G_j(x, y)$ represents a Gaussian filter with a scale of a $\sigma_j$, $\otimes$ is a convolution symbol, $C_j$ is a color restoration factor of an $i^{th}$ color component, $\sigma_j$ represents a scale parameter of a $j^{th}$ Gaussian surround, $\alpha$ is a nonlinear strength adjustment parameter, $\beta$ is a gain factor, and $F_{MSRCR}(x, y)$ is the enhanced result of the processing by the MSRCR algorithm.

S12. Preprocess the image by using the foregoing MSRCR algorithm to improve overall brightness and saturation, reduce noise in the image, allowing the detection model to classify and position obstacles more accurately.

Figure 2:
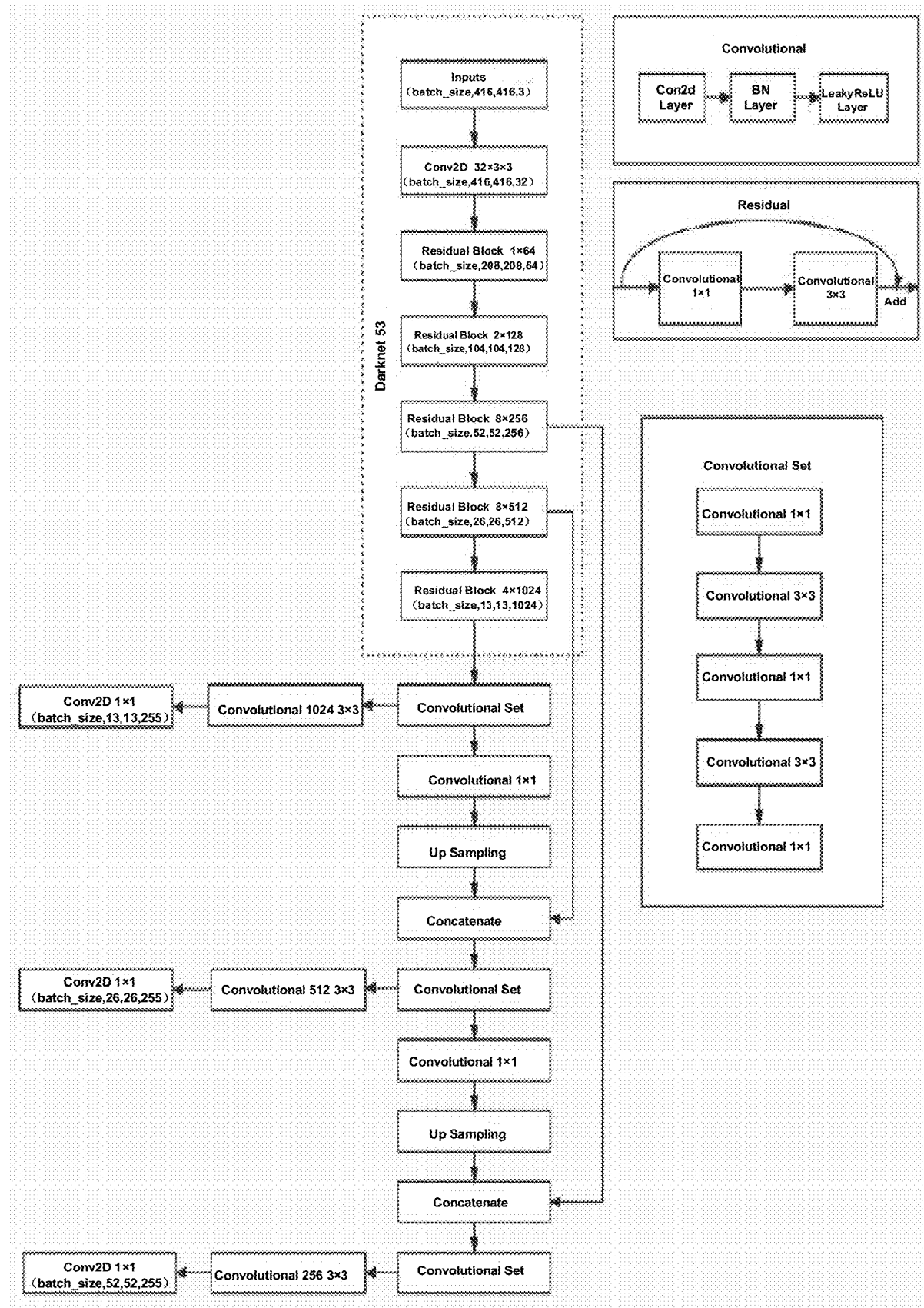
FIG. 2 is an overall structural diagram of a YOLOv3 network used as a basis of an embodiment of the present invention.

S2. The YOLOv3 model is mature, has a stable effect in actual use, and meets requirements of obstacle detection methods, and therefore, YOLOv3 is selected as a detection network for obstacle detection under complex weather. FIG. 2 shows a network structure of YOLOv3 that uses a Darknet53 characteristic extraction network and uses Leaky-ReLU as an activation function. However, in consideration of problems of blur, low contrast, and color fading of the image under complex weather, it is necessary to optimize an original network to identify obstacle types and position obstacles to the maximum extent.

For the YOLOv3 network, the SPP module is introduced to fuse different scale characteristics so that more characteristics are obtained to improve detection accuracy; Leaky-ReLU is replaced with the ELU activation function to increase the robustness to noise, to accurately detect blurry images with low contrast under complex weather conditions; CODA and KITTI data sets that are rich in weather scenes and suitable for obstacle detection scenes are selected as a training set and a test set to increase the robustness of the training model; ground truth boxes in the obtained data set are re-clustered by using a K-Means++ algorithm to obtain anchor boxes that are more suitable for the scene, overcoming the limitation of using K-Means clustering in the original algorithm and the size difference between anchor boxes obtained by clustering different data sets, improving the positioning accuracy of the prediction box; and finally, the improved YOLOv3 network is trained by using the selected training set, to obtain a trained obstacle detection network model for complex weather.

Figure 3:
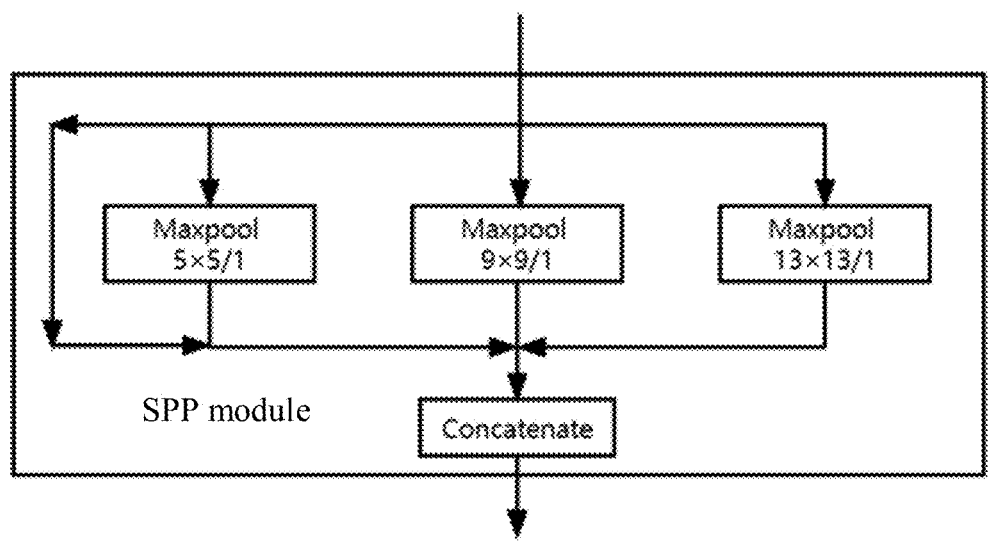
FIG. 3 is a structural diagram of an SPP module according to an embodiment of the present invention.
Figure 4:
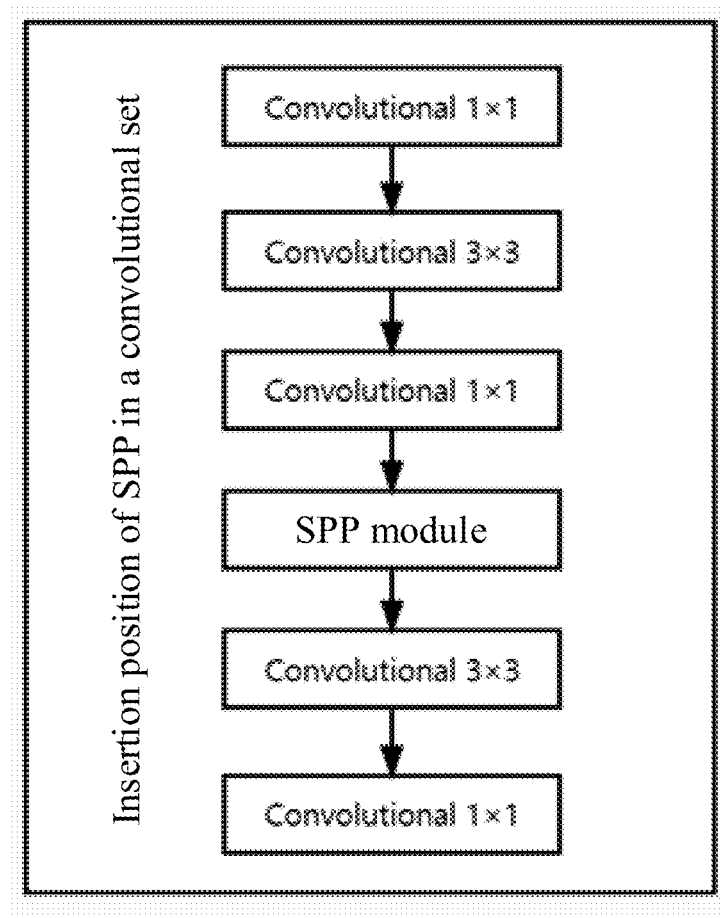
FIG. 4 is a schematic diagram of a position of an SPP module according to an embodiment of the present invention.

The step specifically includes:

S21. Introduce an SPP module to improve recognition accuracy. The SPP module is inserted into the convolutional set of YOLOv3. FIG. 3 shows a structure of the SPP module. FIG. 4 shows an insertion position of the SPP module in the convolutional set. The SPP module includes a total of four branches: a first branch is a branch with direct connection between input and output, a second branch is the maximum pooling with a 5×5 pooling core, a third branch is the maximum pooling with a 9×9 pooling core, and a fourth branch is the maximum pooling with a 13×13 pooling core, where a step size of each pooling is 1, and it is necessary to perform padding before pooling to keep size and depth of a final characteristic map unchanged, so that the SPP module finally fuses different scale characteristics.

The SPP module extracts partial and global characteristics through an idea of spatial pyramid to improve a sensation field of the model. After the SPP module fuses the partial and global characteristics of the characteristic map, expression capability characteristics of the characteristic map can be enriched, thereby alleviating the impact of a large target size difference in the t data set under detection, improving detection accuracy greatly. In a classification network of a full connection layer, it is strictly required that input resolution matches characteristic dimension of the full connection layer. The SPP module can convert FeatherMap of any resolution into a design characteristic vector in the same dimension as the full connection layer, to avoid image distortion caused by operations such as tailoring and scaling of the image region, thereby improving detection accuracy.

Figure 5:
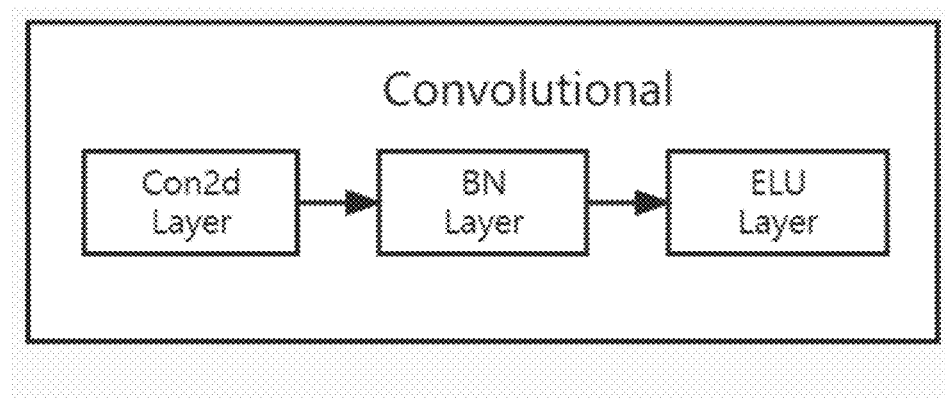
FIG. 5 is a schematic diagram of convolutional layers with an activation function replaced according to an embodiment of the present invention.

S22. As shown in FIG. 5, replace the Leaky-ReLU activation function in convolutional layers in the original YOLOv3 network with the ELU activation function. An appropriate activation function determines capability of the model to solve complex tasks. The activation function used in YOLOv3 is Leaky-ReLU, and a calculation formula is as follows:

$$u = \begin{cases} 0.1m, & m \le 0 \\ m, & m > 0 \end{cases}$$

where u and m represent abscissa and ordinate of the function respectively; however, Leaky-ReLU has very poor robustness, and therefore, the activation function used in each network convolutional layer is changed to ELU; and the calculation formula is as follows:

$$u \begin{cases} e^m - 1, & m \le 0 \\ m, & m > 0 \end{cases}$$

When m is positive, the activation function ELU is the same as Leaky-ReLU. A difference is that an exponential function is used when m in ELU is 0 or negative, and the function gradually converges to a negative value as the parameter becomes smaller. Convergence means that there is a small derivative value, which reduces variation and information propagated to a next layer. Therefore, the ELU activation function is more robust to noise.

S23. Select a representative KITTI data set and CODA data set. The obstacle detection algorithm based on deep learning has to learn characteristic from the data set, so the data set selected needs to be representative and extensive enough to cover complex weather conditions and road scenes. The KITTI data set conforms to the definition and classification of road obstacles, but lacks coverage of complex weather scenes. Therefore, the CODA data set is used to supplement the KITTI data set to obtain a data set that is more suitable for an applicable scenario of the present invention. Obstacles are categorized into car, van, truck, pedestrian, pedestrian (sitting), cyclist, tram, and misc for detection and classification. A complex weather data set part of the CODA data set is expanded through Mixup, Cutmix, and Cutout data enhancement methods, and corresponding tags are modified to allow for conformance to the foregoing classification. Finally, images in the data set are adjusted to a uniform size of 416×416 pixels for ease of training of the YOLOv3 model.

S24. Change a clustering method from the K-Means algorithm to the K-Means++ algorithm. In the K-Means algorithm, if k data points are randomly selected as an initial clustering centroid, the result is easily affected by the selected initial value, and only a partial optimal solution can be obtained. The K-Means++ algorithm is selected to alleviate impact of initial value selection in the K-Means algorithm on the clustering result. In the algorithm, the data points are selected one by one as the centroid to the maximum extent, to ensure the global optimal solution. Step 1: Based on a value of K, a data point is randomly selected as the first initial centroid from the data set, and the value of K is the number of anchor points. Step 2: Calculate distances from other data points to the previous centroid. Step 3: Select a data point farthest away from the current centroid as the next centroid. Similarly, if n initial centroids are selected, a data point farthest away from the current n centroids are selected as an (N+1)th initial centroid until K initial centroids are selected. Step 4: Calculate distances between all the data points and each centroid and classify them into the nearest centroids with each centroid as one category. Step 5: Recalculate the clustering centroid of each category. Steps 4 and 5 are repeated until the centroid variation is less than a threshold. A purpose of YOLOv3 clustering is to make the anchor box and the ground truth box as close as possible, and therefore, a distance calculation formula is as follows:

$$d(\text{box},\text{centroid})=1-\text{IOU}(\text{box},\text{centroid})$$

where the box represents a size of a rectangle, the centroid is a center of the rectangle, and IOU stands for intersection over union of the two rectangles.

The ground truth boxes in the data set are clustered, and finally 9 anchor boxes corresponding to the new data set are obtained. The anchor boxes of YOLOv3 are nine boxes of different sizes obtained by clustering ground truth boxes of the COCO data set by using the K-Means algorithm, which avoids blind search during model training and helps the model to converge quickly. The nine anchor boxes in the YOLOv3 network are obtained by clustering via the K-Means++ algorithm, and network output of three different depths correspond to characteristic maps of three different sizes, and each characteristic map corresponds to three anchor boxes.

S25. Train the detection model. An experimental environment is established, on the deep learning framework, the improved YOLOv3 network is trained under the training set part of the obtained data set, and the parameter is adjusted accordingly according to an actual situation, to obtain a better effect. Mean average precision (mAP) is used to evaluate performance of the algorithm, mAP is a mean of AP, and the calculation formula is as follows:

$$mAP = \frac{\sum_{a=1}^{k} AP_a}{k}$$

where mAP refers to a mean of various categories of AP, $AP_a$ is an area under a precision-recall curve of the $a^{th}$ category, k represents the total number of categories, and a represents an ordinal position number of the category. The AP value can describe an area under the precision-recall curve, and the calculation formula is as follows:

$$\text{precision}=TP/(TP+FP)$$

$$\text{recall}=TP/(TP+FN)$$

where precision represents the precision, recall represents the recall rate, TP stands for true positive, FP stands for false positive, and FN stands for false negative. A larger value of the mean average precision mAP indicates a higher overall recognition accuracy of the model. Finally, the test set is used to verify the detection effect of the model.

S3. Input the preprocessed enhanced image into the trained improved network to obtain detection and classification results, with increased accuracy and robustness, thereby implementing the method for obstacle detection under complex weather.

The step specifically includes:

S31. Enhance images of various scenes under complex weather by MSRCR, then input the images into the previously trained improved YOLOv3 target detection network, and detect, position, and classify specifically obstacles falling into the above pre-defined categories of car, van, truck, pedestrian, pedestrian (sitting), cyclist, tram, and misc, to obtain the detection result, thereby implementing the method for obstacle detection under complex weather.

Embodiment 2

According to a second aspect, this embodiment provides an apparatus for obstacle detection under complex weather, including a processor and a storage medium, where the storage medium is configured to store an instruction; and the processor is configured to operate based on the instruction to perform steps of the method in Embodiment 1.

Embodiment 3

According to a third aspect, this embodiment provides a storage medium, storing a computer program, where when the computer program is executed by a processor, steps of method in Embodiment 1 are implemented.

A person skilled in the art should understand that the embodiments of this application may be provided as a method, a system, or a computer program product. Therefore, this application may use a form of hardware only embodiments, software only embodiments, or embodiments with a combination of software and hardware. In addition, this application may use a form of a computer program product that is implemented on one or more computer-usable storage media (including but not limited to a disk memory, a CD-ROM, an optical memory, and the like) that include computer-usable program code.

This application is described with reference to the flowcharts and/or block diagrams of the method, the device (system), and the computer program product according to the embodiments of this application. It should be understood that computer program instructions may be used to implement each process and/or each block in the flowcharts and/or the block diagrams, or a combination of a process and/or a block in the flowcharts and/or the block diagrams. These computer program instructions may be provided to a general-purpose computer, a special-purpose computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer-readable memory that can instruct the computer or any other programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

It can be learned from common technical knowledge that the present invention can be implemented through other embodiments without departing from its spirit or essential characteristics. Therefore, the foregoing disclosed embodiments are illustrative other than exclusive from all the perspectives. All changes within the scope of the present invention or the scope equivalent to that of the present invention are included in the present invention.

What is claimed is:

1. A method for obstacle detection under complex weather, comprising:
   obtaining an image under a complex weather condition;
   performing enhanced preprocessing on the image by using a multi-scale retinex with color restoration MSRCR algorithm to obtain a preprocessed image;
   inputting the preprocessed image into a trained obstacle detection model based on an improved YOLOv3 network; and
   according to output of the obstacle detection model based on the improved YOLOv3 network, determining an obstacle detection result under the complex weather;
   wherein a method for establishing the obstacle detection model based on the improved YOLOv3 network comprises:
   inserting an SPP module into a convolutional set of YOLOv3 to fuse different scale characteristics for extraction of more detailed information to further improve detection accuracy, and replacing a Leaky-ReLU activation function in convolutional layers in the original YOLOv3 network with an ELU activation function to increase robustness to noise;
   obtaining a data set for obstacle detection under different weather conditions to improve robustness of the training model;
   re-clustering ground truth boxes in the data set by using a K-Means++ algorithm to obtain suitable anchor boxes, increasing a convergence speed of sample training and improving positioning accuracy; and
   training the obstacle detection model with the processed data set to obtain the trained obstacle detection model based on the improved YOLOv3 network;
   wherein the obtaining a data set for obstacle detection under different weather conditions to improve robustness of the training model comprises: selecting a representative KITTI data set and CODA data set, and supplementing the KITTI data set using the CODA data set with corresponding tags modified, to obtain the data set for obstacle detection in different weather conditions; and reserving a test set from the obtained data set, and using the rest of the data set as a training set to increase the robustness of the training model.

2. The method for obstacle detection under complex weather according to claim 1, wherein the performing enhanced preprocessing on the image by using a multi-scale retinex with color restoration MSRCR algorithm comprises:
   employing a weighted sum of several different Gaussian scale parameters, using a Gaussian filtering result as an estimated illumination image, and adding a color restoration factor to restore color of a reflection image to avoid color degradation, with a calculation formula as follows:

$$F_{MSRCR}(x, y) = C_i \sum_{j=1}^{N} \omega_j [lgI_i(x, y) - lg(I_i(x, y) \otimes G_j(x, y))]$$

$$G_j(x, y) = \frac{1}{2\pi\sigma_j^2} \exp\left(-\frac{x^2+y^2}{2\sigma_j^2}\right)$$

$$C_i = \beta lg\left[\frac{\alpha I_i(x, y)}{\sum_{i=1}^{3} I_i(x, y)}\right]$$

wherein $F_{MSRCR}$ (x, y) is an enhanced result of the processing by the MSRCR algorithm, x and y represent abscissa and ordinate of image pixels respectively, i represents an ordinal position number of a color component, j represents an ordinal position number of a scale parameter, $C_i$ is a color restoration factor of an $i^{th}$ color component, N is the number of scale parameters, $\omega_j$ is weight corresponding to different scales, $I_i$ (x, y) represents an $i^{th}$ color component of the input image, $G_j$ (x, y) represents a Gaussian filter with a scale of $\sigma_j$, $\sigma_j$ represents a scale parameter of a $j^{th}$ Gaussian surround, $\otimes$ is a convolution symbol, $\alpha$ is a nonlinear strength adjustment parameter, and $\beta$ is a gain factor.

3. The method for obstacle detection under complex weather according to claim 2, wherein N=3, representing three scales: small, medium and large.

4. The method for obstacle detection under complex weather according to claim 1, wherein the SPP module comprises a total of four branches: a first branch is a branch with direct connection between input and output, a second branch is the maximum pooling with a 5×5 pooling core, a third branch is the maximum pooling with a 9×9 pooling core, and a fourth branch is the maximum pooling with a 13×13 pooling core, wherein a step size of each pooling is 1, and padding is performed before pooling to keep size and depth of a final characteristic map unchanged, so that the SPP module finally fuses different scale characteristics.

5. The method for obstacle detection under complex weather according to claim 1, wherein the replacing a Leaky-ReLU activation function in convolutional layers in the original YOLOv3 network with an ELU activation function comprises:
   the ELU activation function being represented by a calculation formula:

$$u = \begin{cases} e^m - 1, & m \leq 0 \\ m, & m > 0 \end{cases}$$

wherein u and m represent abscissa and ordinate of the function respectively, the ELU activation function has a non-zero gradient for all negative values, eliminating the problem of neuron death, wherein when abnormal input occurs in use of the ELU activation function, no large gradient is produced during backward propagation, preventing neuron death and vanishing gradient, which can shorten training time and improve accuracy in network training; when m in ELU is 0 or negative, an exponential function is used, and as the parameter decreases, the function gradually converges to a negative value; convergence means that there is a small derivative value, which reduces variation and information propagated to a next layer; and therefore, the ELU activation function is more robust to noise, able to reduce impact of image noise on the detection result.

6. The method for obstacle detection under complex weather according to claim 1, wherein the supplementing the KITTI data set using the CODA data set with corresponding tags modified comprises:

categorizing obstacle tags into car, van, truck, pedestrian, pedestrian (sitting), cyclist, tram, and misc for detection and classification;

expanding a complex weather data set part of the CODA data set through Mixup, Cutmix, and Cutout data enhancement methods, and modifying corresponding tags to allow for conformance to the classification of obstacle tags; and adjusting images in the data set to a uniform size of 416×416 pixels for ease of training of the obstacle detection model based on the improved YOLOv3 network.

7. The method for obstacle detection under complex weather according to claim 1, wherein the training the obstacle detection model with the processed data set comprises:

training the improved YOLOv3 network under the training set part of the data set, adjusting parameters according to an actual situation, and evaluating performance of the model by using mAP, a mean of various categories of AP, wherein a calculation formula is as follows:

$$mAP = \frac{\sum_{a=1}^{k} AP_a}{k}$$

wherein mAP refers to a mean of various categories of AP, $AP_\alpha$ is an area under a precision-recall curve of the $a^{th}$ category, k represents the total number of categories, and a represents an ordinal position number of the category; and a larger value of the mean average precision mAP indicates a higher overall recognition accuracy of the model, with the reserved test set used to verify the effect, and the trained obstacle detection model based on the improved YOLOv3 network is thus obtained.

8. An apparatus for obstacle detection under complex weather, comprising a processor and a non-transitory storage medium, wherein the non-transitory storage medium is configured to store an instruction; and the processor is configured to operate according to the instruction to perform the steps of the method of claim 1.

9. A non-transitory storage medium, storing a computer program, wherein when the computer program is executed by a processor, the steps of the method of claim 1 are implemented.

* * * * *